US011062392B1

(12) United States Patent
Curatola et al.

(10) Patent No.: US 11,062,392 B1
(45) Date of Patent: Jul. 13, 2021

(54) SYSTEMS AND METHODS OF PERSONALIZED INFLATION MODELING BASED ON ACTIVITY MONITORING

(71) Applicant: Wells Fargo Bank, N.A., San Francisco, CA (US)

(72) Inventors: Joseph C. Curatola, South Milwaukee, WI (US); Heather Henke, San Francisco, CA (US); Peter Speidel, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 140 days.

(21) Appl. No.: 15/942,107

(22) Filed: Mar. 30, 2018

(51) Int. Cl.
*G06Q 40/06* (2012.01)
*G06Q 10/06* (2012.01)

(52) U.S. Cl.
CPC ........... *G06Q 40/06* (2013.01); *G06Q 10/067* (2013.01)

(58) Field of Classification Search
CPC ........ G06Q 40/06; G06Q 40/00; G06Q 40/08; G06Q 40/02; G06Q 40/04; G06Q 40/10; G06Q 40/12; A61B 5/0022; A61N 1/37252; A61N 1/3956; G07F 17/3288; G07F 7/10
USPC ........ 705/2, 4, 35, 3 R, 37, 36 R; 607/3, 60; 600/323
See application file for complete search history.

(56) References Cited

U.S. PATENT DOCUMENTS

| | | |
|---|---|---|
| 5,884,283 A | 3/1999 | Manos |
| 6,249,770 B1 | 6/2001 | Erwin et al. |
| 7,711,619 B2 | 5/2010 | Merton et al. |
| 7,962,394 B2 | 6/2011 | Wagner |
| 8,060,428 B1 | 11/2011 | Abrahamson |
| 8,527,387 B2 | 9/2013 | Robb |
| 8,799,033 B2 | 8/2014 | Kravitz et al. |
| 2002/0095363 A1* | 7/2002 | Sloan ..................... G06Q 40/02 705/36 R |

(Continued)

OTHER PUBLICATIONS

AXA Equitable Life Insurance Company, "LIVIT: understanding my retirement challenges", https://us.axa.com/nonindexed/app/rc/ReadMore/RC15_LIVIT_Brochure.pdf, 2017. 12 pages.

*Primary Examiner* — Alexander G Kalinowski
*Assistant Examiner* — Sanjeev Malhotra
(74) *Attorney, Agent, or Firm* — Foley & Lardner LLP

(57) ABSTRACT

A system for personalized inflation modeling and mitigation includes a network interface, a database, and a processing circuit. The processing circuit is structured to receive user data comprising spending information, a current investment portfolio of a user, and information obtained from an activity sensor. The processing circuit is further structured to: determine a predicted spending profile indicating a prediction of future spending of the user for each spending category of a set, develop a personal inflation liability model based on the determined predicted spending profile and predicted inflation information, where the personal inflation liability model indicates a personalized future inflation risk associated with at least one of the spending categories, generate an optimal investment portfolio configured to mitigate the personalized future inflation risk based on the current investment portfolio and the personal inflation liability model, and modify the current investment portfolio based on the optimal investment portfolio.

23 Claims, 6 Drawing Sheets

(56) References Cited

U.S. PATENT DOCUMENTS

| | | | |
|---|---|---|---|
| 2002/0111890 A1* | 8/2002 | Sloan | G06Q 40/00 705/36 R |
| 2003/0097324 A1 | 5/2003 | Speckman | |
| 2003/0126054 A1 | 7/2003 | Purcell, Jr. | |
| 2004/0111358 A1* | 6/2004 | Lange | G07F 17/32 705/37 |
| 2005/0010510 A1* | 1/2005 | Brose | G06Q 40/00 705/35 |
| 2006/0089895 A1* | 4/2006 | Joye | G06Q 40/00 705/35 |
| 2006/0212380 A1* | 9/2006 | Williams | G06Q 40/06 705/35 |
| 2007/0038542 A1 | 2/2007 | Armstrong et al. | |
| 2007/0156559 A1* | 7/2007 | Wolzenski | G06Q 40/08 705/35 |
| 2008/0168006 A1 | 7/2008 | Merton et al. | |
| 2008/0288416 A1* | 11/2008 | Arnott | G06Q 40/00 705/36 R |
| 2009/0024540 A1* | 1/2009 | Ryder | G06Q 40/06 705/36 R |
| 2009/0307088 A1 | 12/2009 | Littlejohn | |
| 2010/0004957 A1* | 1/2010 | Ball | G06Q 40/00 705/4 |
| 2010/0185561 A1* | 7/2010 | Torre | G06Q 40/00 705/36 R |
| 2010/0262563 A1* | 10/2010 | Arnott | G06Q 40/00 705/36 R |
| 2011/0098788 A1* | 4/2011 | Quiles | A61N 1/37254 607/60 |
| 2011/0191263 A1* | 8/2011 | Torre | G06Q 40/00 705/36 R |
| 2011/0251978 A1* | 10/2011 | Davies | G06Q 40/00 705/36 R |
| 2012/0022995 A1* | 1/2012 | Lange | G06Q 40/08 705/37 |
| 2012/0165883 A1* | 6/2012 | Kalgren | A61B 5/1118 607/3 |
| 2012/0239416 A1* | 9/2012 | Langva | G06Q 40/08 705/2 |
| 2013/0072770 A1* | 3/2013 | Rao | G16H 40/67 600/323 |
| 2013/0117199 A1* | 5/2013 | Arnott | G06Q 40/06 705/36 R |
| 2014/0046872 A1* | 2/2014 | Arnott | G06Q 40/06 705/36 R |
| 2014/0136381 A1* | 5/2014 | Joseph | G06Q 40/02 705/35 |
| 2014/0143173 A1* | 5/2014 | Wagner | G06Q 40/06 705/36 R |
| 2014/0143175 A1* | 5/2014 | Greenshields | G06Q 40/06 705/36 R |
| 2014/0188758 A1 | 7/2014 | Harper et al. | |
| 2014/0229403 A1* | 8/2014 | Ramkumar | G06Q 40/06 705/36 R |
| 2014/0317017 A1* | 10/2014 | Torre | G06Q 40/06 705/36 R |
| 2014/0351171 A1* | 11/2014 | Samson | G06Q 40/06 705/36 R |
| 2015/0058260 A1 | 2/2015 | Mun | |
| 2016/0110812 A1 | 4/2016 | Mun | |
| 2016/0110814 A1* | 4/2016 | Harris | G06Q 40/06 705/36 R |
| 2016/0275615 A1* | 9/2016 | Dintenfass | G06Q 40/06 |
| 2016/0358264 A1* | 12/2016 | Brightman | G06Q 40/06 |
| 2017/0024821 A1* | 1/2017 | Sherman | G06Q 40/06 |
| 2017/0213288 A1 | 7/2017 | Zhang et al. | |

* cited by examiner

SYSTEMS AND METHODS OF PERSONALIZED INFLATION MODELING BASED ON ACTIVITY MONITORING

BACKGROUND

Many consumers seek financial advice for short term and long term goals. For example, a consumer may have a long-term retirement goal of saving money to pursue a particular hobby or interest. Successfully meeting the retirement goal may depend on a financial strategy that can account for various risks, such as inflation, market conditions, etc. Some automated computer-based systems have attempted to facilitate financial planning and advising, but these systems often lack the ability to develop a financial strategy that can adequately mitigate certain risks on a personalized level.

SUMMARY

In one embodiment, a provider computing system includes a network interface, a database, and a processing circuit having a processor and a memory. The network interface is structured to facilitate data communication via a network. The database is structured to store information associated with transactions and accounts held by an institution associated with the provider computing system. The processing circuit is structured to receive user data, where the user data comprises spending information, a current investment portfolio of a user, and information obtained from an activity sensor that senses activity associated with the user. The processing circuit is further structured to determine a predicted spending profile for the user based on the spending information and the information obtained from the activity sensor, where the predicted spending profile indicates a prediction of future spending of the user for each spending category of a set of spending categories. The processing circuit is further structured to develop a personal inflation liability model for the user based on the determined predicted spending profile and predicted inflation information associated with each of the spending categories, where the personal inflation liability model indicates a personalized future inflation risk associated with at least one of the spending categories based on the predicted inflation information. The processing circuit is further structured to generate an optimal investment portfolio based on the predicted spending profile and the personal inflation liability model, where the optimal investment portfolio is configured to mitigate the personalized future inflation risk. The processing circuit is further structured to modify the current investment portfolio based on the optimal investment portfolio.

In another embodiment, a system includes a user device, an activity sensor, and a provider computing system. The activity sensor is structured to sense activity associated with a user. The provider computing system includes a network interface, a database, and a processing circuit having a processor and a memory. The network interface is structured to facilitate data communication via a network. The database is structured to store information associated with transactions and accounts held by an institution associated with the provider computing system. The processing circuit is structured to receive user data from at least one of the user device or the activity sensor, where the user data comprises spending information, a current investment portfolio of a user, and information obtained from the activity sensor. The processing circuit is further structured to determine a predicted spending profile for the user based on the spending information and the information obtained from the activity sensor, where the predicted spending profile indicates a prediction of future spending of the user for each spending category of a set of spending categories. The processing circuit is further structured to develop a personal inflation liability model for the user based on the determined predicted spending profile and predicted inflation information associated with each of the spending categories, where the personal inflation liability model indicates a personalized future inflation risk associated with at least one of the spending categories based on the predicted inflation information. The processing circuit is further structured to generate an optimal investment portfolio based on the predicted spending profile and the personal inflation liability model, where the optimal investment portfolio is configured to mitigate the personalized future inflation risk. The processing circuit is further structured to modify the current investment portfolio based on the optimal investment portfolio.

In another embodiment, a method is disclosed. The method includes receiving, from a user device, user data comprising spending information and a current investment portfolio of a user. The method also includes determining, by a processing circuit of a provider computing system, a predicted spending profile for the user based on the spending information, the predicted spending profile indicating a prediction of future spending of the user for each spending category of a set of spending categories. The method also includes developing, by the processing circuit, a personal inflation liability model for the user based on the determined predicted spending profile and predicted inflation information associated with each of the spending categories, the personal inflation liability model indicating a personalized future inflation risk associated with at least one of the spending categories based on the predicted inflation information. The method also includes generating, by the processing circuit, an optimal investment portfolio based on the predicted spending profile and the personal inflation liability model, the optimal investment portfolio configured to mitigate the personalized future inflation risk. The method also includes modifying, by the processing circuit, the current investment portfolio based on the optimal investment portfolio.

These and other features, together with the organization and manner of operation thereof, will become apparent from the following detailed description when taken in conjunction with the accompanying drawings.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

DETAILED DESCRIPTION

Figure 1:
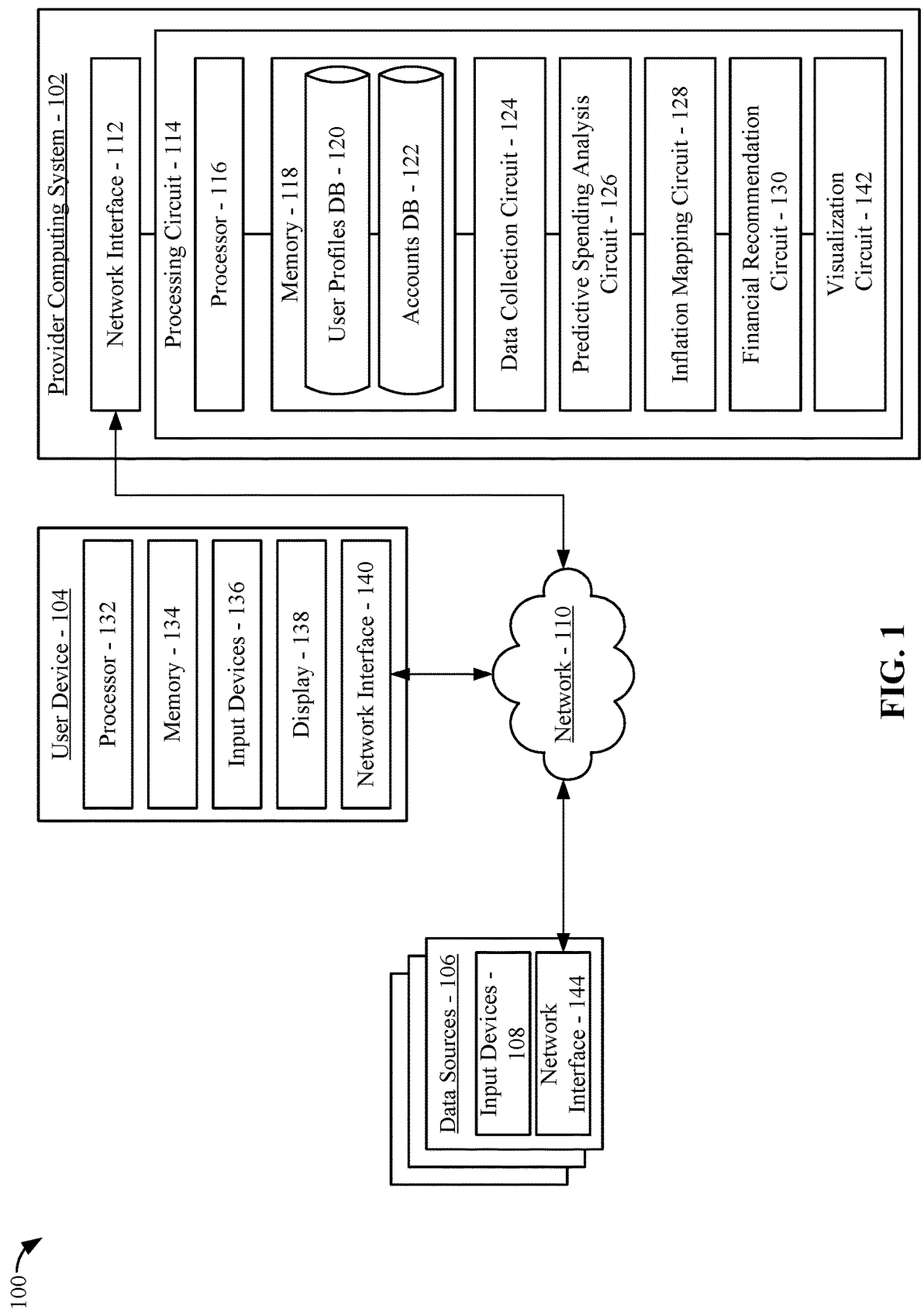
FIG. 1 is a diagram of a system for personalized inflation modeling and mitigation, according to an example embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting. For example, the embodiments of systems and methods discussed herein may be relevant to any of a variety of circumstances where modeling inflation and mitigating inflation risk may be useful.

Referring to the figures generally, systems, methods, and apparatuses for personalized inflation modeling and mitigation are described herein. A provider computing system can be structured to receive spending information and other user data from various data sources, such as a user device, an activity sensor (e.g., a wearable device, an implantable device), and IoT devices. The provider computing system can be structured to generate a predicted spending profile relating to a user based on the received information. The predicted spending profile may categorize future spending in one or more spending categories. The predicted spending profile can include a set of spending categories, each having a dollar value or proportion value relating to a predicted level of spend of the user for the spending category. The provider computing system can be structured to develop a personalized inflation liability model by associating inflation prediction data with one or more spending categories of the predicted spending profile.

The inflation prediction data may relate to projected inflation associated with the costs of goods and services of each spending category. Because categories of goods and services are susceptible to different rates of inflation, an individual that is projected to spend more in one category of goods and services relative to other categories and/or other retirees may be exposed to relatively higher inflation risks with respect to that spending category. For example, general healthcare costs may significantly increase relative to other spending categories by the time an individual retires (e.g., ten, twenty, or thirty years from the present day), and therefore an individual that is projected to have significant healthcare costs in the future during retirement is more exposed to inflation risks of healthcare costs than someone that is not projected to have significant healthcare costs in the future. Additionally or alternatively, the individual may specifically be exposed to higher inflation risks of healthcare costs relative to other retirees because of poor exercise and dietary habits, which may be determined based on data received from devices configured to monitor these habits (e.g., a wearable device, a smart appliance). Similarly, general transportation costs may significantly increase relative to other spending categories, and/or the user may specifically be exposed to a higher inflation risk of transportation relative to other retirees if, for example, the individual plans to purchase a recreational vehicle ("RV") and drive across the country during retirement.

The provider computing system can be structured to determine one or more recommended modifications of an investment portfolio of the user to mitigate inflation risks with respect to one or more spending categories. In this regard, the recommended modifications may allow the user to mitigate a risk of inflation with respect to particular spending categories personal to the user. Accordingly, the recommended modifications determined by the provider computing system can mitigate a risk that the user has a diminished ability to purchase specific desired goods and services in the future.

An example implementation may be described as follows. A provider computing system can be structured to gather information manually provided by a user. For example, the user can provide information via a user device, such as information relating to likely spending habits during retirement, a likely retirement age, health status, hobbies, interests, etc. The provider computing system can also be structured to gather information automatically collected from various data sources, which may include an activity sensor, the user device, and various connected devices to gather health information of the user. In some embodiments, the activity sensor may be a wearable device (e.g., a smart watch, a pedometer) and/or an implantable device (e.g., a medical device). In some embodiments, the connected devices can include "IoT" devices, such as exercise equipment that automatically measures exercise activity or kitchen equipment that automatically determines nutritional and diet information. The provider computing system can be structured to determine a predicted spending profile based on the manually provided information and the automatically collected information. The predicted spending profile can relate to categorizing predicted retirement spending of the user in various spending categories.

The provider computing system can be structured to develop a personalized inflation liability model by associating inflation prediction data with one or more spending categories of the predicted spending profile. For example, the provider computing system can receive inflation prediction data relating to projected inflation with respect to healthcare goods and services to determine a personal risk of inflation with respect to a particular user's healthcare spending during retirement. The provider computing system can be structured to provide one or more recommended modifications of the user's investment portfolio to mitigate healthcare inflation risks of the user. In some embodiments, the provider computing system can suggest an investment (e.g., a stock, a mutual fund) of a specific pharmaceutical company, a specific biomedical company, a specific insurance provider, etc. For example, if collected information suggests the user has a particular heart condition, the provider computing system can recommend investing in a specific company specializing in treating that heart condition, a group of companies having products relating to treating heart conditions in general, or the medical sector through individual stocks, mutual funds, or index funds.

Beneficially, systems and methods disclosed herein can use data collected from various data sources (e.g., an activity sensor) to automatically determine an investment strategy for an individual that facilitates mitigating inflation risks specific to that individual. A provider computing system can be structured to gather data manually provided by a user (e.g., via a user device) and/or data automatically collected from various data sources, such as a user device, an activity sensor (e.g., a wearable device, an implantable device), and any number of connected devices. The provider computing system can improve on existing systems by using collected data to predict future spending of the individual and to automatically determine an optimal investment strategy that strategically allocates assets to particular sectors of the economy. For example, the provider computing system can analyze collected data to identify particular sectors specific to the user's predicted spending habits and selectively allocate the user's assets to investment products in those sectors. Additionally or alternatively, the provider computing system can allocate the user's assets to investment products in sectors that are generally predicted to undergo larger inflation rates relative to other sectors of the economy. In some embodiments, the provider computing system can be structured to continuously collect data from the data sources, for example to quickly identify future personalized inflation risks and/or to determine subsequent recommended modifications of an investment portfolio to mitigate identified inflation risks of the user. Compared to existing systems, systems and methods disclosed herein not only allow quicker identification of optimal investments specific to a user, but also require less effort by the user due to automatic data collection from various data sources.

Referring to FIG. 1, a block diagram of a system 100 for personalized inflation modeling and mitigation is shown according to an example embodiment. As described in further detail herein, the system 100 may generally be structured to facilitate mitigating personalized inflation risks that may negatively affect a user's future purchasing power. In particular, the system 100 can generate a personalized inflation liability model based on data received from various components of the system 100. The system 100 is shown to include a provider computing system 102. The provider computing system 102 can be associated with a provider institution, such as a bank or other financial institutions.

The provider computing system 102 is generally structured to communicate with external systems over the network 110. In this regard, the network 110 generally provides communicable and operative coupling between the provider computing system 102, one or more user devices 104, the data sources 106, and other components described herein to provide and facilitate communications (e.g., of data, instructions, messages, values, commands). Accordingly, the network 110 may include any network including wired (e.g., Ethernet) and/or wireless networks (e.g., 802.11X, ZigBee, Bluetooth, Wi-Fi). In some arrangements, the network 110 includes the Internet. In further embodiments, the network 110 includes a proprietary banking network to provide secure or substantially secure communications.

The provider computing system 102 is shown to include a processing circuit 114 having a processor 116 and a memory 118. The processor 116 may be implemented as a general-purpose processor, an application specific integrated circuit (ASIC), one or more field programmable gate arrays (FPGAs), a digital signal processor (DSP), a group of processing components, or other suitable electronic processing components. The memory 118 may include one or more memory devices (e.g., RAM, NVRAM, ROM, Flash Memory, hard disk storage) and may store data and/or computer code for facilitating the various processes described herein. Moreover, the memory 118 may be or include tangible, non-transient volatile memory or non-volatile memory. Accordingly, the memory 118 may include database components, object code components, script components, or any other type of information structure for supporting the various activities and information structures described herein.

The provider computing system 102 further includes a network interface 112, which is used to establish connections with other components of the system 100 by way of the network 110. In this regard, the network interface 112 is structured to include hardware (e.g., Ethernet controller, memory) and software necessary to facilitate data communications for the provider computing system 102 over the network 110. The network interface 112 includes program logic that facilitates connection of the provider computing system 102 to the network 110. The network interface 112 supports communication between the provider computing system 102 and other systems. For example, the network interface 112 can include a cellular modem, a Bluetooth transceiver, a Bluetooth beacon, a radio-frequency identification (RFID) transceiver, and a near-field communication (NFC) transmitter. In some embodiments, the network interface 112 communicates via a secured wired connection. In some arrangements, the network interface 112 includes the hardware and machine-readable media sufficient to support communications over multiple channels. Further, in some arrangements, the network interface 112 includes cryptography capabilities to establish a secure or relatively secure communication session with the provider computing system 102. In this regard, data may be encrypted and transmitted to prevent or substantially prevent the threat of hacking.

The provider computing system 102 may include various databases in the memory 118. For example, the provider computing system 102 is shown to include a user profiles database 120 and an accounts database 122. Although shown as being part of the memory 118, in some arrangements of the system 100, the user profiles database 120 and/or the accounts database 122 are separate components of the provider computing system 102.

In some embodiments, the user profiles database 120 and/or the accounts database 122 are structured to selectively provide access to stored information. In this regard, each of the user profiles database 120 and the accounts database 122 can be communicably and operatively coupled to the data collection circuit 124, the predictive spending analysis circuit 126, the inflation mapping circuit 128, the financial recommendation circuit 130, and/or the visualization circuit 144. Although shown as being part of the memory, in some arrangements the user profiles database 120 and/or the accounts database 122 is a separate component of the provider computing system 102. In some embodiments, stored information can also be selectively retrieved from external devices (e.g., one or more user devices 104) via the network interface 112.

The accounts database 122 can be structured to hold, store, categorize, and otherwise serve as a repository for information associated with accounts held by persons and/or business entities. In some embodiments, the accounts database 122 is structured to store financial accounts held by a financial institution associated with the provider computing system 102. For example, the accounts database 122 may store financial information relating to debit card transactions, credit card transactions, a savings account, a checking account, investment accounts, and the like. The accounts database 122 may also store information relating to a user associated with the user device 104, including a legal name, current and former addresses, a government identification number, date of birth, and any other information relating to the user.

The user profiles database 120 can be structured to hold, store, categorize, and otherwise serve as a repository for information associated with user profiles of a plurality of users. As used herein, a "user" is a person or entity seeking financial services. Each user profile can include information relating to personal characteristics, investment products, and spending characteristics of the user as described herein.

A user profile can include personal information of the user, including nonfinancial information. For example, a user profile can include identity-related or legal information of the user, such as a birthdate, a mailing address, marriage status, authentication information (e.g., login credentials, biometric information), etc. In some embodiments, a user profile can also include information relating to hobbies, interests, health information, medical conditions, income, debt liabilities (e.g., mortgage), and/or dependents.

In some embodiments, user profile information relates to a future time period. For example, a user profile can include an indication of an expected retirement age and hobbies or interests that a user wishes to devote financial assets to during retirement. In some embodiments, user profile information can also include information associated with retirement income, such as social security income, maturity dates of investment products, expected changes to debt liabilities or assets (e.g., selling a property), etc.

A user profile can include information relating to a current investment portfolio of the user. A current investment portfolio can include information relating to savings, assets, and investment products currently held by the user. For example, a current investment portfolio can include any information relating to a checking account balance, a savings account balance, stocks, currencies, bonds, cash, annuities, and other investment products described herein. In some embodiments, each investment product in a current investment portfolio is associated with a spending category as described herein. In some embodiments, a current investment portfolio can relate to holdings of retirement accounts (e.g., a 401(k) account) and other investment products for retirement. In this regard, a user profile can include information relating to a position (e.g., dollar amount) of each investment product held by the user. A user profile can include any other information relating to available income during retirement, such as a maturity date, risk level, growth, etc.

A user profile can include spending information relating to the user. Spending information can relate to current and/or historical spending, such as specific instances, patterns, and trends of spending. For example, spending information includes a timeseries of historical transactions by the user. In this regard, the timeseries of historical transactions can be automatically received from the accounts database 122. In some embodiments, historical transactions and other spending information may be associated with a spending category as described herein.

A user profile can include information relating to a predicted spending report of the user. A predicted spending report of a user can be determined based on spending information and other user profile information as described herein. In some embodiments, a predicted spending report relates to categorizing proportions of predicted retirement spending to various spending categories. For example, a predicted spending report can include a set of spending categories and a corresponding dollar value relating to a predicted level of spend of each spending category. Each dollar value may relate to a repeating time increment (e.g., each month, each year).

In some embodiments, the number and type of spending categories of a user profile corresponds to investable asset categories that may be at least partially tracked by a government agency (e.g., the Bureau of Labor Statistics) or private organization. For example, spending categories of a user profile may correspond to the United States Consumer Price Index (CPI), core-CPI, the CPI-U (for urban consumers), CPI-W (for Urban Wage Earners and Clerical Workers), CPI-E (for the elderly), and the like. In an example arrangement, a predicted spending report of a user profile can relate to four spending categories respectively associated with energy, healthcare, housing, and transportation spending. In this example, a predicted monthly or yearly spend value can be determined for each of the four spending categories for various future time periods. In this regard, an amount of predicted spend can be compared across spending categories and/or time periods.

The data collection circuit 124 can be structured to collect and aggregate data from components of the system 100. In this regard, data collection circuit 124 can be structured to receive data from the user device 104 and/or the data sources 106 via the network interface 112. Received data can generally relate to any type of information useful to facilitate systems and methods described herein for personalized inflation modeling and mitigation. In some embodiments, received data can relate to spending, investment products, and other user profile information as described herein. In some embodiments, received data can also relate to market conditions and other general information that may be useful for developing a personalized inflation liability model.

In some embodiments, the data collection circuit 124 can be structured to collect information manually provided by a user. For example, manually provided information can relate to one or more questionnaire responses provided by a user of the user device 104, such as through a user interface generated by the visualization circuit 142 as described herein. Manually provided information can relate to income, current and future planned spending, spending prioritization, owned investment products, risk tolerance, a current savings balance, income stream, debt obligations, reoccurring costs, problems or questions of a user, financial options, etc. Manually provided information can also relate to nonfinancial information of the user, such as a current age, an estimated retirement age, a list of hobbies, a list of interests, etc.

In some embodiments, the data collection circuit 124 is structured to collect input information automatically gathered by a component of the system 100. In this regard, the data collection circuit 124 can be structured to communicate a command or request to a data source via the network 110 with an instruction to provide gathered or stored data. Automatically gathered information can be collected from any component of the system 100, such as the user device 104, the data sources 106, and/or other databases of the memory 118. For example, the data sources 106 can include an activity sensor, such as a wearable device structured to automatically receive health information of the user and transmit received health information to the data collection circuit 124. In some embodiments, the data sources 106 includes a "connected" device (e.g., an IoT connected device) structured to automatically gather health information of the user and/or information relating to a hobby or interest of the user, as described herein.

In some embodiments, the data collection circuit 124 is structured to collect data stored in the memory 118 of the provider computing system 102. For example, the data collection circuit 124 can be structured to collect information relating to a transaction history from the accounts database 122. Additionally or alternatively, the data collection circuit 124 can be structured to receive user profile information from the user profiles database 120. In some embodiments, the data collection circuit 124 is structured to automatically collect stored data.

The data collection circuit 124 can be structured to provide collected data to one or more components of the provider computing system 102. In some embodiments, the data collection circuit 124 can be structured to store collected data in one or more databases of the memory 118, for example by associating collected data with one or more user profiles stored in the user profiles database 120. In some embodiments, the data collection circuit 124 can be additionally or alternatively structured to provide collected data to the inflation mapping circuit 128, the financial recommendation circuit 130, and/or the visualization circuit 144.

The predictive spending analysis circuit 126 can be structured to generate a predicted spending report for a user profile. In some embodiments, a predicted spending report can include predicted retirement spending. In some embodiments, the predictive spending analysis circuit 126 is structured to store a generated predicted spending report in one or more databases of the memory 118, for example by associating the generated predicted spending report with a user profile stored in the user profiles database 120. A predicted spending report of a user can be determined based on spending information and other user profile information as described herein.

In some embodiments, the predicted spending report relates to categorizing predicted spend to each of a set of spending categories, as described herein. For example, a predicted spending report can include a set of spending categories and each spending category can have a corresponding dollar value. The corresponding dollar value can relate to a predicted level of spend over a recurring time increment (e.g., each month, each year). The number and type of spending categories may vary by user profile. In some embodiments, the number and type of spending categories of a user profile corresponds to investable asset categories that may be at least partially tracked by a consumer price index. For example, a predicted spending report can include eight spending categories corresponding to eight groups tracked by a consumer price index, such as food, housing, apparel, transportation, healthcare, recreation, education and communication, and other goods and services.

In some embodiments, one or more of the eight spending categories can be modified or separated into subcategories. This may be desirable when a spending category does not sufficiently reflect retirement spending or illuminate how investment products can be desirably adjusted. For example, a user profile may have a predicted spending report that does not include a spending category relating to education and communication, because only minimal education and communication spending is predicted to be incurred by the user during retirement. In another example, a predicted spending report may separate a general housing category into two categories, with one category relating to home ownership costs and another category relating to apartment rent costs. This may be desirable, for example if inflation with respect to home ownership is likely inversely proportional to inflation with respect to apartment rent costs. In this example, the additional detail provided by the two categories may indicate that the user is exposed to higher inflation risks, even though inflation with respect to general housing indicates otherwise.

The predictive spending analysis circuit 126 can be structured to determine a predicted spending report of a user based on information collected by the data collection circuit 124 and/or information stored in the memory 118. In some embodiments, the predicted spending report is at least partially determined based on manually provided information by a user (e.g., via the user device 104). For example, input information may have been manually provided by a user in the form of responses to a questionnaire relating to an expected retirement age, hobbies and interests, an acceptable investment risk level, etc. In some embodiments, the predictive spending analysis circuit 126 is structured to determine a predicted spending report at least partially based on automatically provided information. For example, health information may have been automatically provided from one or more of the data sources 106 as described herein.

In some embodiments, the predictive spending analysis circuit 126 can be structured to generate a predicted spending report based on input information indirectly related to a user. In some embodiments, a predicted spending report can be generated or adjusted based on general spending predictions corresponding to one or more spending categories. For example, healthcare costs specific to a user may be expected to generally increase as the user ages, and general healthcare costs may also be expected to increase in the future due to inflation and other factors. In this regard, the predicted spending report can be at least partially based on the general healthcare cost increases.

In some embodiments, the predictive spending analysis circuit 126 can be structured to determine a predicted spending report by adjusting a generic model. The model may include various baseline values applicable to a global population or subsets of users. For example, one model can generically relate to a year in which an individual starts retirement, and the model may include baseline predicted spend values according to general spending predictions. In this regard, the predictive spending analysis circuit 126 can be structured to adjust one or more baseline values of the model to generate a predicted spending report of a user. The predictive spending analysis circuit 126 can be structured to generate a predicted spending report using any type of model as described herein. In some embodiments, a model can be based on information received from an external source, such as a third-party service, an educational institution, and/or a government institution.

The inflation mapping circuit 128 can be structured to generate a personalized inflation liability model. In some embodiments, the inflation mapping circuit 128 is structured to store generated personalized inflation liability models in one or more databases of the memory 118. For example, the inflation mapping circuit 128 can be structured to store a generated personalized inflation liability model in the user profiles database 120 by associating it with a user profile stored therein. The inflation mapping circuit 128 can be structured to generate a personalized inflation liability model using information received from one or more circuits of the provider computing system 102, from the user device 104, and/or from the data sources 106.

In some embodiments, the personalized inflation liability model is specific to the user and generally relates to an indication of a risk of inflation associated with one or more spending categories of the user's predicted spending report. An inflation risk with respect to a particular spending category may arise if the user's predicted spending in that spending category is higher relative to other individuals (e.g., other retirees). Additionally or alternatively, an inflation risk with respect to a particular spending category may arise if costs in that spending category are generally predicted to significantly increase. In either situation, a user may be exposed to a risk of inflation, which may diminish the user's ability to purchase desired goods and services.

In some embodiments, the inflation mapping circuit 128 is structured to generate a personalized inflation liability model by associating inflation prediction data with one or more spending categories of a predicted spending report.

The inflation prediction data may directly or indirectly relate to projected domestic inflation associated with costs of goods and services of each spending category. In some embodiments, the inflation prediction data is based on information received from an external source, such as a third-party service, an educational institution, and/or a government institution.

In an example implementation, a predicted spending report indicates that during retirement, a user will likely devote an increased proportion of assets to healthcare relative to other retirees. Additionally or alternatively, inflation prediction data predicts a general increase of inflation corresponding to healthcare costs relative to other spending categories. In this regard, the inflation mapping circuit 128 can be structured to generate a personalized inflation liability model relating to an increased level of inflation risk for healthcare spending. For example, the inflation mapping circuit 128 may be structured to marginally increase a proportion of healthcare spending to account for the increased level of inflation. Additionally or alternatively, the inflation mapping circuit 128 may be structured to associate a flag with the spending category indicating the inflation risk.

The financial recommendation circuit 130 can be structured to determine one or more recommended modifications of a current investment portfolio of a user. The current investment portfolio can relate to a current set of investment products or assets of a user, including but not limited to: stocks, mutual funds, ETFs, CDs (certificate of deposit), banking products (e.g., a money market account, a savings account), bonds, annuities, retirement account funds, college savings funds, options, commodity futures, insurance products, alternative currencies, etc.

In one example implementation, a personalized inflation liability model indicates the user will likely be exposed to a higher risk of inflation for healthcare spending relative to other retirees during the same time period. In this regard, the financial recommendation circuit 130 can be structured to recommend a modification to the current investment portfolio for mitigating the risk. For example, the financial recommendation circuit 130 may recommend increasing an investment amount of the user allocated to a pharmaceutical ETF, and/or recommending one or more new financial products the user may desire investing in. The financial recommendation circuit 130 may also recommend adjusting (e.g., decreasing) an investment amount of one or more other investment products of the current investment portfolio to achieve a desired proportion level of each spending category.

In some embodiments, the financial recommendation circuit 130 is structured to initially determine an optimal investment portfolio. In this regard, the financial recommendation circuit 130 can be structured to determine one or more recommended modifications based on a comparison of the current investment portfolio to the optimal investment portfolio. The optimal investment portfolio can include any number and type of investment products, including, but not limited to: stocks, mutual funds, ETFs, CDs (certificate of deposit), banking products (e.g., a money market account, a savings account), bonds, annuities, retirement account funds, college savings funds, options, commodity futures, insurance products, alternative currencies, etc.

In some embodiments, the optimal investment portfolio relates to a recommended set of spending categories. The optimal investment portfolio can include an investment proportion value for each of the spending categories. In this regard, each of the recommended set of spending categories can be provided to facilitate a diversified investment portfolio, and the corresponding investment proportion value can be strategically adjusted to mitigate inflation risks specific to the user. In some embodiments, the optimal investment portfolio can include one or more specific investment products corresponding to each of the spending categories.

The visualization circuit 144 can be structured to generate a user interface for display. For example, the visualization circuit 144 can be structured to generate a user interface for display by the user device 104 (e.g., via the display 138). In some embodiments, visualization circuit 144 is structured to generate a user interface configured to receive manually provided information as described herein. In this regard, the generated user interface may include various questions or prompts with data entry fields for receiving a user input.

In some embodiments, the visualization circuit 144 is structured to generate a visualization using information stored in the memory 118, such as the user profile information stored in the user profiles database 120. For example, the generated visualization can include information relating to a predicted spending report, a personalized inflation liability model, a current investment portfolio and/or recommended modifications. An example of a generated visualization is shown herein with reference to FIG. 6.

The user device 104 can be a device associated with a user. For example, the user can be a customer of an institution associated with the provider computing system 102. In this regard, the provider computing system 102 can be structured to store information relating to the user in the user profiles database 120 and/or the accounts database 122. Although the system 100 shows one user device 104, in other arrangements multiple user devices 104 may be included in the system 100.

The user device 104 is shown to include a processor 132, a memory 134, input devices 136, a display 138, and a network interface 140. The processor 132 and the memory 134 can be structured as described herein with reference to the processor 116 and the memory 118, respectively. The network interface 140 can be any suitable network interface, such as described herein with reference to the network interface 112. The user device 104 also includes a display 138 that presents graphical user interfaces to the user. In some embodiments, the display 138 can be structured to provide a user interface generated by the visualization circuit 144 showing information of a user profile, such as information relating to predicted spending report and/or a personalized inflation liability model. In some embodiments, the display 138 is not provided.

The user device 104 can include any type and number of input devices 136. The input devices 136 can relate to any type of hardware device structured to receive input information. For example, the input devices 136 can include a touch screen, keyboard, mouse, switches, dials, buttons, and the like. In some embodiments, the input devices 136 include a camera or image-sensing device configured to detect and/or receive biometric information relating to the user, such as a fingerprint, iris-based information, and facial recognition information. In some embodiments, the input devices 136 include a microphone configured to receive voice-based biometric identification information.

The user device 104 may be any type of device including, but not limited to, a phone (e.g., a smartphone), a tablet computer, a laptop computer, and/or a personal digital assistant. In some embodiments, the user device 104 may be a wearable device and/or an implantable device as described herein. In some embodiments, the user device 104 can relate to a device for monitoring the health of the user. The user device 104 may be a scale, a body mass index (BMI) calculator, and/or a medical device (e.g., heart rate monitor, a blood pressure monitor, a diagnostic device). In some embodiments, the user device 104 may be a wearable device and/or an implantable device as described herein. In some embodiments, the user device 104 may be a wearable device that monitors physical activity of the user (e.g., a device that tracks the number of steps walked by the user over time, a GPS-based device that tracks the distanced jogged or otherwise traveled by the user, etc.).

In some embodiments, the user device 104 is structured to conduct transactions with various merchants. In this regard, the user device 104 can also be structured to facilitate mobile payments, such as through an NFC transceiver and a mobile payment application. In some embodiments, the user device 104 can be structured to communicate with components of the system 100 over the network 110, such as through a text or SMS message, an email, and/or an alert.

The data sources 106 can relate to any type and number of devices structured to receive and/or store data. In some embodiments, one or more of the data sources 106 is structured to provide received and/or stored data to the provider computing system 102. In this regard, the data sources 106 is shown to include a network interface 142. The network interface 142 can be any suitable interface, such as described herein with reference to the network interface 112. In some embodiments, the network interface 142 is structured to communicate data between the provider computing system 102 via the network 110.

The data sources 106 is shown to include input devices 108. In some embodiments, the input devices 108 can be structured as described herein with reference to the input devices 136. For example, the input devices 108 can include a touch screen, keyboard, mouse, a microphone, a camera or image-sensing device and/or any other input device described herein. In some embodiments, the data sources 106 include a database or repository. For example, the data sources 106 can include a database structured to store financial information relating to transactions of a user, market performance, inflation, investment products, etc.

The data sources 106 can include any device structured to receive information that may be useful for determining a predicted spending report. For example, the data sources 106 can include an activity sensor structured to gather information associated with activity of a user. In some embodiments, the data sources 106 includes at least one "connected" device (e.g., IoT connected device) structured to receive health information of a user and/or information relating to a hobby or interest of the user. Some example embodiments of data sources 106 are further described herein with reference to FIGS. 2-4.

Figure 3:
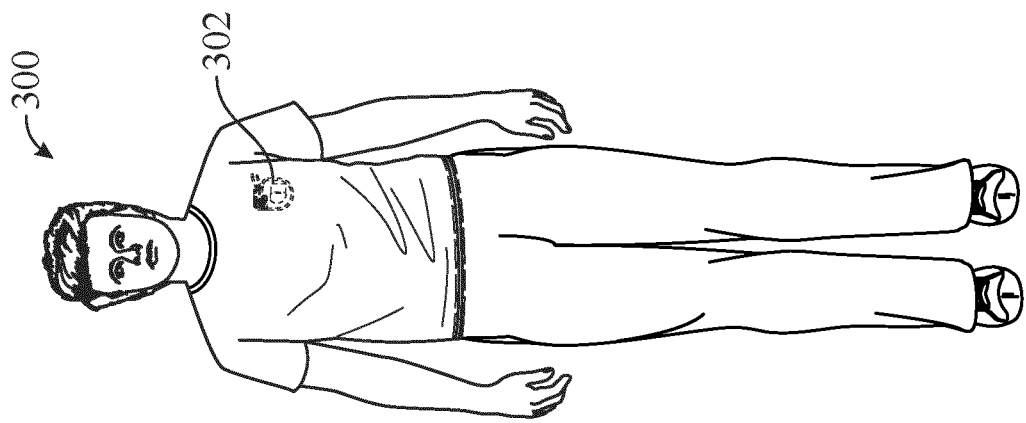
FIG. 3 shows another example implementation of a data source of the system of FIG. 1 whereby the data source is an activity sensor, according to an example embodiment.
Figure 2:
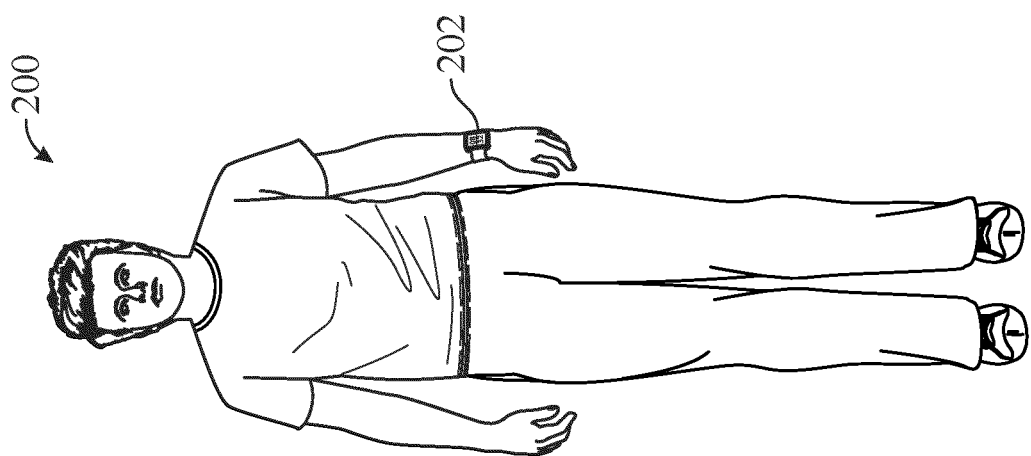
FIG. 2 shows an example implementation of a data source of the system of FIG. 1 whereby the data source is an activity sensor, according to an example embodiment.
Figure 4:
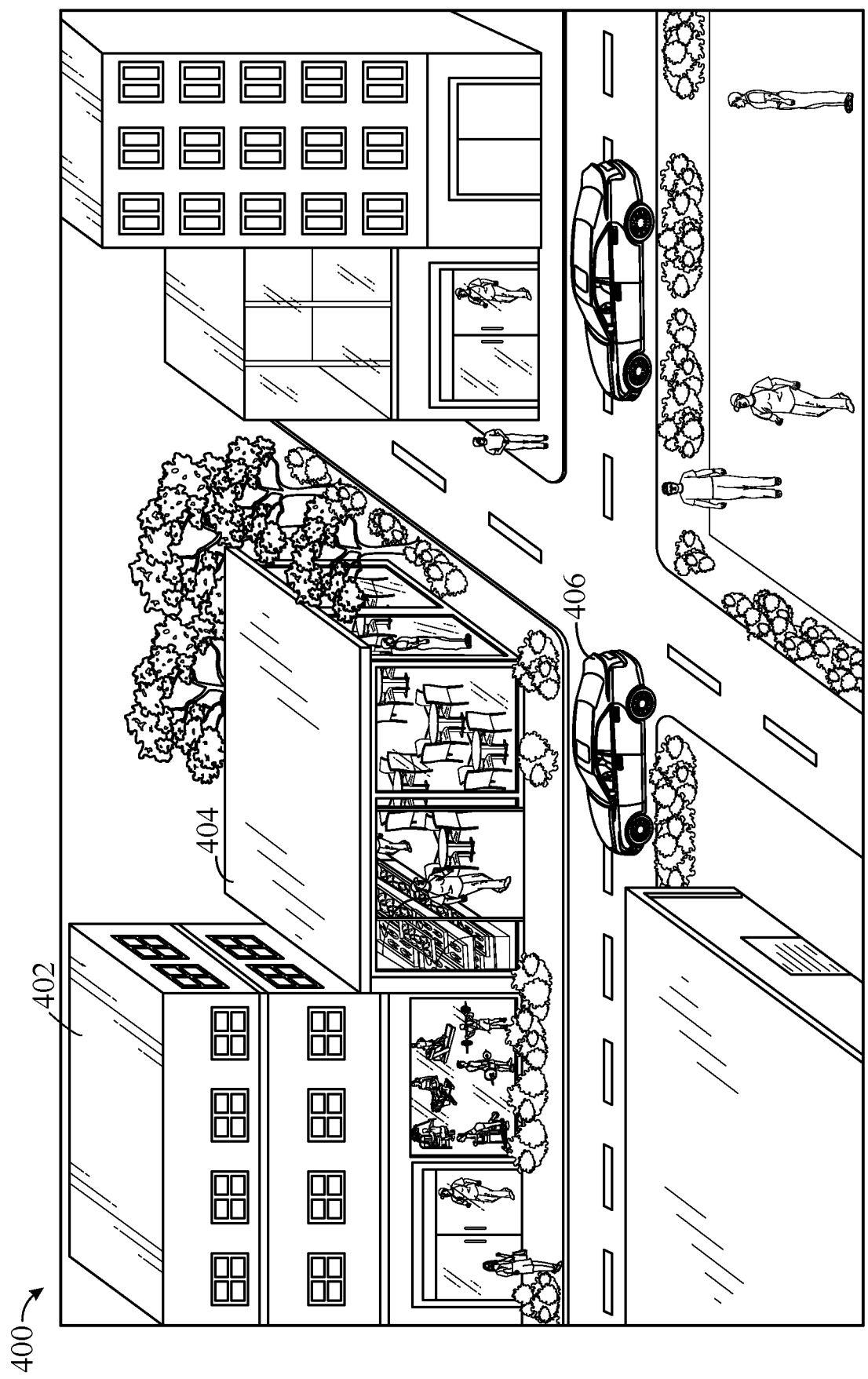
FIG. 4 shows an example implementation of multiple data sources of the system of FIG. 1, according to an example embodiment.

Referring to FIGS. 2-4, various example implementations of data sources are shown, according to some example embodiments. In particular, FIGS. 2-4 show various examples of how a data source can be used to gather input data to facilitate systems and methods described herein. In some embodiments, the data sources of FIGS. 2-4 can relate to the data source 106 as described herein.

FIG. 2 shows an example implementation 200 in which a data source is an activity sensor, particularly a wearable device 202 worn by a user. As used herein, a "wearable device" refers to any type of device that a user wears including, but not limited to, a watch, glasses, a bracelet, shoes, clothing, etc. In some embodiments, the wearable device 202 is a device intended to be capable of being placed on and/or removed from a body part by the user. Although the wearable device 202 is shown around a wrist, in other implementations the wearable device 202 can be worn on or around other body parts. The wearable device 202 can include one or more input devices and/or a network interface, such as the input devices 108 and the network interface 144, respectively, as described herein.

The wearable device 202 can be structured to send and receive health information of the user. For example, the wearable device 202 can be structured to measure a heart rate level, a blood pressure level, and/or any biological, chemical, physiological, and biomedical information of a user. In this regard, the wearable device 202 can include one or more input devices structured to receive data relating to health information of the user. For example, the wearable device 202 can include an optical heart rate sensor structured to measure a heart rate level of a user. The wearable device 202 can be structured to include a network interface for transmitting received data.

The wearable device 202 can be structured to additionally or alternatively receive information not directly related to health information of a user. In some embodiments, the wearable device 202 can be structured to include one or more input devices for receiving information relating to movements of a user, such as a GPS device, an accelerometer, a gyroscope or gyro sensor, etc. In some embodiments, the wearable device 202 can be structured to include one or more input devices for receiving information relating to environmental conditions of a user, such as a temperature sensor, a barometer sensor, etc. In some embodiments, the wearable device 202 can be structured to facilitate mobile payments as described herein.

FIG. 3 shows an example implementation in which a data source is an activity sensor, particularly an implantable device 302 in or on a body part of a user. As used herein, an implantable device refers to any type of device implanted in a user, such as a pacemaker, a defibrillator, a dermally-implanted sensor, a microchip implant, etc. In some embodiments, the implantable device 302 is a device that is not intended to be capable of being placed in and/or removed from a body part by the user, such as a pacemaker that is surgically placed in a chest by a doctor. Although the implantable device 302 is shown within a chest area of the user, in other implementations the implantable device 302 can be in or on other body parts. The implantable device 302 can include one or more input devices and/or a network interface, such as the input devices 108 and the network interface 144, respectively, as described herein.

The implantable device 302 can be structured to receive health information of the user. For example, the implantable device 302 can be structured to measure a heart rate level, a blood pressure level, and/or any biological, chemical, physiological, and biomedical information of a user. In this regard, the implantable device 302 can include one or more input devices structured to receive data relating to health information of the user. For example, the input devices can include a biosensor structured to receive a glucose level of a user. The implantable device 302 can be structured to additionally or alternatively receive information not directly related to health information of a user, such as described herein with reference to the wearable device 202. In some embodiments, the implantable device 302 is structured to provide an output (e.g., an electrical pulse) or otherwise act on the user. For example, the implantable device 302 can be a pacemaker structured to provide electrical pulses to prompt the user's heart to beat at a normal rate.

In one example implementation, both the wearable device 202 and the implantable device 302 can be provided. In some embodiments, the wearable device 202 can be communicably coupled to the implantable device 302, allowing the wearable device 202 to receive health data from the implantable device 302. In this regard, the wearable device 202 can be structured to communicate data received from the implantable device 302 to other devices of the system 100. For example, the wearable device 202 can be structured to transmit data received from the implantable device and/or data collected by the wearable device to the provider computing system 102. In some embodiments, the wearable device 202 may be communicably coupled to the user device 104. In this regard, the user device 104 and/or wearable device 202 can be structured to transmit data from the wearable device 202, the implantable device 302, and/or the user device 104 to the provider computing system 102.

FIG. 4 shows an example implementation of a system 400 having a plurality of data sources. In particular, the system 400 includes various data sources that may be configured in various building structures, devices, vehicles, etc. For example, the data sources of the system 400 can include an activity sensor described with reference to FIGS. 2-3 and/or "connected" devices (e.g., IoT connected devices). In some embodiments, one or more of the data sources of the system 400 are structured to include one or more input devices and/or a network interface, such as described herein with reference to the input devices 108 and the network interface 144, respectively.

System 400 illustrates an example of how various data sources can be strategically chosen and placed in various locations to facilitate systems and methods disclosed herein for personalized inflation modeling and mitigation. In this regard, the system 400 can include data sources relating to various building equipment and systems, including but not limited to, security systems, exercise equipment, kitchen equipment, financial transaction systems, HVAC systems, lighting systems, and other stationary and nonstationary devices. In some embodiments, the system 400 can include at least one activity sensor structured to automatically collect activity and/or health information of a user as described herein. In this regard, collected data can be provided to the provider computing system 102, which can be structured to identify a level of predicted spend relating to future healthcare costs as described herein. Similarly, one or more data sources of the system 400 can be structured to collect information relating to a hobby or interest, which may be useful for determining predicted spend of healthcare and/or other spending categories.

System 400 is shown to include a health facility 402. The health facility 402 may include activity sensors structured to collect health information of a user and/or store collected health information. For example, one activity sensor can relate to a treadmill that captures workout activity of a user, such as a duration of a workout, frequency of workouts, workout changes over time, etc. Another activity sensor can relate to a scale for measuring weight or body fat percentage, and/or calculating a BMI (body mass index) value. The health facility 402 may include a data source relating to a local computing device that stores health reports (e.g., workout activity, diet, goals) recorded by a fitness trainer, dietitian, or the like. Another data source can relate to medical information (e.g., medical history, diagnostic information, treatments) recorded by a nurse, doctor, or medical professional.

In some embodiments, the health facility 402 can include data sources structured to collect information relating to a user interest. In some embodiments, the health facility 402 can include activity sensors or building sensors that detect when a particular facility or equipment is used. For example, the health facility 402 may include a building sensor that detects usage of a basketball court or a climbing wall.

System 400 is shown to include a cafeteria 404. The cafeteria 404 can include data sources structured to collect health information of a user and/or store collected health information. In some embodiments, a data source of the cafeteria 404 can be structured to automatically detect or determine nutritional information of a user by identifying food and beverages the user consumes. For example, a data source (e.g., a refrigerator, a kiosk) can be structured to detect an identifier of a food product that a user selects for purchase, and the data source can subsequently retrieve nutritional information relating to the food product based on the identifier. The data source can repeat this process for each food and beverage the user consumers over a particular time period. In some embodiments, the cafeteria 404 can include a data source structured to store spending or transactional information of a user.

System 400 is shown to include a vehicle 406. In some embodiments, the vehicle 406 can include data sources (e.g., an activity sensor) structured to collect information relating to a user interest and/or store collected information. For example, an activity sensor of the vehicle 406 can include a meter or sensor structured to measure fuel consumption. In some embodiments, the vehicle 406 can include an activity sensor structured to determine a location of the vehicle 406. In this regard, collected information may facilitate determining various interests or hobbies of the user, for example by identifying destinations of the vehicle 406. In some embodiments, an activity sensor of the vehicle 406 can be structured to collect acceleration and/or speed data of the vehicle 406, for example to determine driving behaviors of the user. Although vehicle 406 is shown to be an automobile, in other embodiments of the system 400, the vehicle 406 can relate to a motorcycle, a truck, a RV, a boat, an aircraft, etc.

Referring again to FIGS. 2-4, information received from the wearable device 202, the implantable device 302, and/or the data sources and activity sensors of the system 400 (e.g., the health facility 402, the cafeteria facility 404, and/or the vehicle 406) can be provided to the provider computing system 102 as described herein. In some embodiments, at least one of the data sources (e.g., an activity sensor) can be structured to automatically collect and store received data, and subsequently transmit received data to the data collection circuit 124 according to a predetermined frequency or event. For example, the data collection circuit 124 can be structured to communicate a command or request to a data source via the network 110 with an instruction to provide stored data. Received data may be stored in the memory 118 (e.g., the user profiles database 120) and used by one or more circuits of the provider computing system 102 (e.g., the predictive spending analysis circuit 126, the inflation mapping circuit 128) as described herein.

It will be appreciated that the example implementations described in FIGS. 2-4 are only intended to illustrate some examples of data sources that may be used to gather information of a user profile (e.g., for determining a predicted spend report). Other implementations can include any combination of activity sensors and other data sources, which may be the same or different. For example, another example implementation can include some or all of the data sources of the system 400 provided in a residence and/or a vehicle of a user having the wearable device 202 and/or the implantable device 302.

Figure 5:
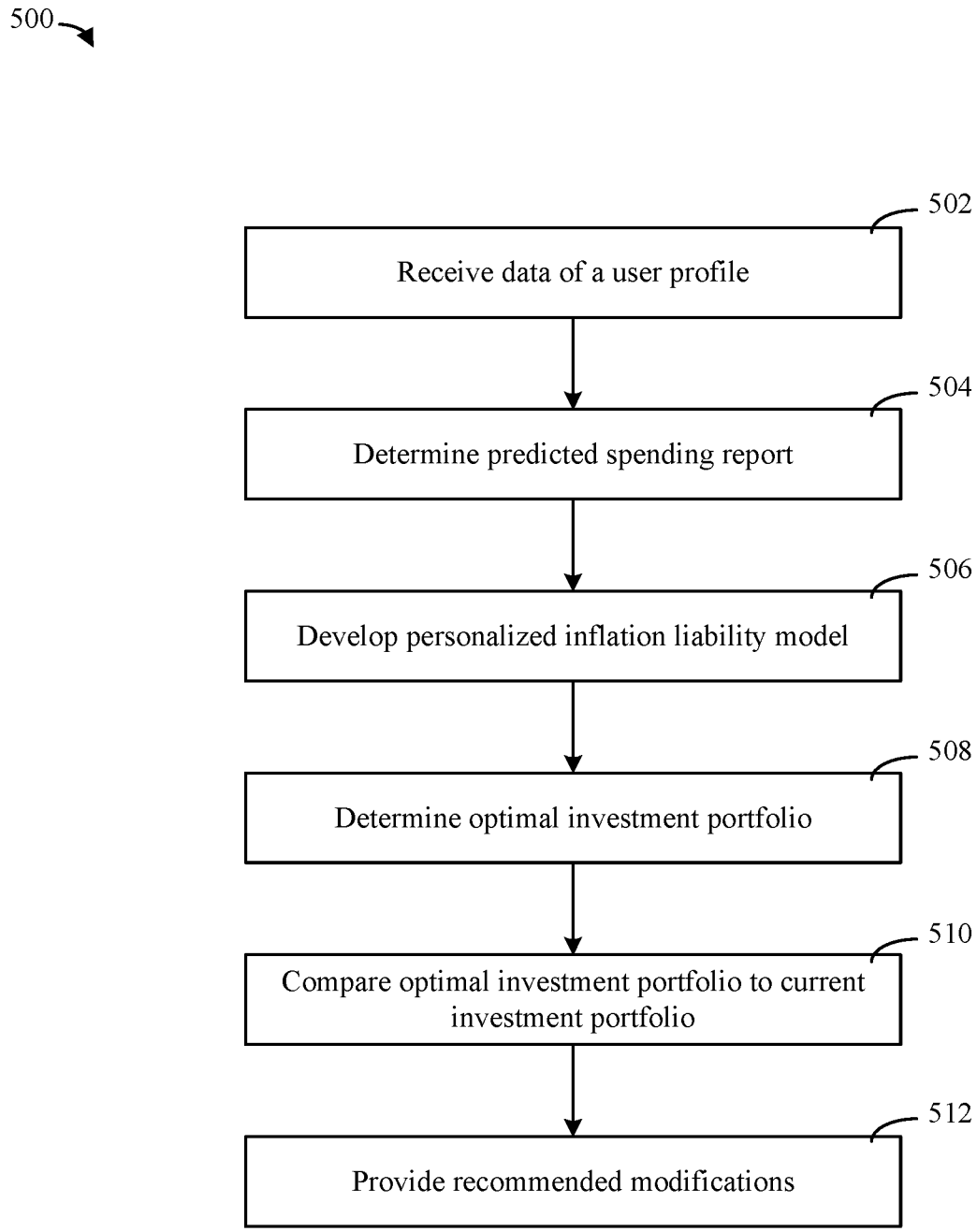
FIG. 5 is a flow diagram of a method of personalized inflation modeling and mitigation, according to an example embodiment.

Referring to FIG. 5, a flow diagram of a method 500 for personalized inflation modeling and mitigation using a personalized inflation liability model is shown according to an example embodiment. In some embodiments, the method 500 is performed by one or more circuits of the provider computing system 102.

At step 502, data relating to a user profile is received. Data can be received from any component of the system 100, such as the user device 104, the data sources 106, and/or other databases of the memory 118. In some embodiments, data is received via the network 110. In some embodiments, received data is associated with a stored user profile corresponding to a user.

Received data can generally relate to any type of information to facilitate personalized inflation modeling and mitigation using a personalized inflation liability model as described herein. In some embodiments, received data relates to spending information of a user, such as a type and amount of predicted spend during retirement. In some embodiments, received data relates to investment products and other user profile information as described with reference to FIGS. 1-4. In some embodiments, received data can also relate to market conditions and other general information that may be useful for generating a predicted spending report and/or personalized inflation liability model.

In some embodiments, received data relates to manually provided input information. For example, manually provided information can be received by a user providing one or more questionnaire responses via the user device 104. Manually provided information can relate to income, current and future spending, spending prioritization, investment products, risk tolerance, a current savings balance, income stream, debt obligations, reoccurring costs, problems, questions, financial options. Manually provided information can also relate to nonfinancial information, such as a current age, an estimated retirement age, a list of hobbies, a list of interests, etc.

In some embodiments, data is automatically received, such as from the user device 104 and/or one or more of the data sources 106. For example, received data can relate to health information of a user measured by an activity sensor (e.g., a wearable device and/or an implantable device), as described herein. In some embodiments, received data relates to a data source corresponding to a connected device (e.g., an IoT connected device) structured to automatically collect health information of a user and/or information relating to a hobby or interest of user, as described herein. In some embodiments, information can be automatically received from the accounts database 122, such as information relating to a transaction history and/or investment products of the user.

At step 504, a predicted spending report is determined. In some embodiments, a predicted spending report can relate to a predicted level of spend during a retirement age and/or a time period before retirement. A predicted spending report of a user can be determined based on spending information and other user profile information as described herein.

In some embodiments, the predicted spending report relates to categorizing a predicted level of spend across each of a set of spending categories, as described herein. For example, a predicted spending report can include a set of spending categories and a corresponding dollar value relating to a predicted level of spend over a repeating time increment (e.g., each month, each year). The number and type of spending categories can vary by user profile. In some embodiments, the number and type of spending categories of a user profile corresponds to investable asset categories that may be at least partially tracked by the consumer price index. For example, a predicted spending report can include eight spending categories corresponding to the eight groups tracked by the consumer price index, such as food, housing, apparel, transportation, healthcare, recreation, education and communication, and other goods and services.

In some embodiments, one or more of the eight spending categories can be modified or separated to subcategories. This may be desirable when a spending category does not sufficiently reflect retirement spending or illuminate how investment products can be desirably adjusted. For example, a user profile may have a predicted spending report that does not include a spending category relating to education and communication, because only minimal education and communication spending is predicted during retirement. In another example, a predicted spending report may include a category relating to home ownership costs and a category relating to apartment rent, rather than one category relating to housing. This may be desirable if inflation with respect to home ownership is inversely proportional to inflation with respect to apartment rent.

In some embodiments, the predicted spending report is at least partially determined based on information manually provided by a user (e.g., via the user device 104). For example, input information can be manually provided by a user as responses to a questionnaire relating to an expected retirement age, types of hobbies and interests, an acceptable risk level, etc. In one example implementation, received data may include questionnaire responses indicating a user desires to purchase and travel in a RV (recreational vehicle) during retirement. In this regard, the predicted spending report can include an indication that the user will likely devote relatively more spend during retirement on energy and transportation costs, and relatively less spend on housing costs than a typical retiree. In another example implementation, received data may indicate a user plans to move to another geographic location, such as a city with a higher cost of living relative to other geographic locations. In this regard, the user may be exposed to not only higher housing costs, but also higher cost of living expenses (e.g., food, recreation, and other goods and services).

In some embodiments, the predicted spending report is at least partially determined based on automatically collected information. For example, when received health information indicates the user is more likely to have higher health costs during retirement, the predicted spending report can include an indication that the user will likely devote relatively more spend during retirement on healthcare costs. As another example, when received health information indicates the user lives an active lifestyle, the predicted spending report can include an indication that the user will likely devote relatively less spend on healthcare.

A predicted spending report can be determined based on input information indirectly related to a user. For example, healthcare costs of a user may be generally expected to increase as the user ages. In this regard, the predicted spending report can be adjusted to reflect the increased healthcare spending. The predicted level of healthcare spend can be adjusted based on other input information, such as automatically provided input information received from the data source 106 (e.g., an activity sensor) indicating the user may be expected to devote more spending towards healthcare relative to a general population set.

In some embodiments, a predicted spending report is determined by adjusting a generic model. The model may include various baseline values applicable to a global population or subsets of users. For example, one model can generically relate to a year in which an individual starts retirement, and the model may include baseline predicted spend values according to general spending predictions. In this regard, one or more baseline values of the model can be adjusted to determine a predicted spending report of a user. For example, a predicted spending report can be adjusted by decreasing a relative baseline healthcare cost value when received information indicates the user leads an active lifestyle.

A predicted spending report can be determined using any type of model having any number and type of baseline values for spending categories. For example, rather than a single model corresponding to a retirement year, two models can be provided for each calendar year, with one relating to men and another relating to women. Each of the two models can include an identical or different set of baseline values for each spending category or set. Additionally or alternatively, a model can relate to other characteristics, such as demographic or residential characteristics (e.g., population size, cost of living, median household income, crime). In some embodiments, the type of model and/or the number and type of spending categories of each model can vary by year. In some embodiments, a model can be based on information received from an external source, such as a third-party service, an educational institution, and/or a government institution.

At step 506, a personalized inflation liability model is generated. In some embodiments, the personalized inflation liability model is specific to the user and generally relates to an indication of a risk of inflation associated with one or more spending categories of the user's predicted spending report. An inflation risk with respect to a particular spending category may arise if the user's predicted spending in that spending category is higher relative to other individuals (e.g., other retirees). Additionally or alternatively, an inflation risk with respect to a particular spending category may arise if costs in that spending category are generally predicted to significantly increase. In either situation, a user may be exposed to a risk of inflation, which may diminish the user's ability to purchase desired goods and services.

In some embodiments, a personalized inflation liability model can relate to associating inflation prediction data with one or more spending categories of a predicted spending report. The inflation prediction data can correspond to domestic inflation predictions that may directly or indirectly relate to each spending category. In some embodiments, the inflation prediction data is based on information received from an external source, such as a third-party service, an educational institution, and/or a government institution.

In an example implementation, a predicted spending report indicates a user will likely devote an increased proportion of assets to healthcare during retirement, and inflation prediction data indicates an increased level of inflation corresponding to healthcare costs when the user enters retirement. In this regard, a generated personalized inflation liability model can include an indication relating to an increased level of inflation risk for healthcare spending as described herein.

In another example implementation, a predicted spending report indicates a user will likely devote an increased proportion of assets to transportation and energy during retirement (e.g., because the user plans to purchase and travel in an RV upon retirement), and inflation prediction data indicates an increased level of inflation corresponding to transportation and/or energy when the user enters retirement. In this regard, a generated personalized inflation liability can include an indication relating to an increased level of inflation risk for transportation and/or energy costs as described herein.

At steps 508-512, one or more recommended modifications of a current investment portfolio is determined. In some embodiments, an optimal investment portfolio can be initially determined (step 508). Either or both of the current investment portfolio and an optimal investment portfolio can relate to a current set of investment products or assets of a user, including but not limited to: stocks, mutual funds, ETFs, CDs (certificate of deposit), banking products (e.g., a money market account, a savings account), bonds, annuities, retirement account funds, college savings funds, options, commodity futures, insurance products, alternative currencies, etc. In some embodiments, steps 508-510 are omitted, and step 512 involves determining one or more recommended modifications to the current investment portfolio.

In some embodiments, determining the optimal investment portfolio relates to determining a recommended set of spending categories. The optimal investment portfolio can include an investment proportion value for each of the spending categories. In this regard, each of the recommended set of spending categories can be provided to facilitate a diversified investment portfolio, and the corresponding investment proportion value can be strategically adjusted to mitigate inflation risks specific to the user. In some embodiments, the optimal investment portfolio can include one or more specific investment products corresponding to each of the spending categories.

At step 510, the optimal investment portfolio is compared against the current investment portfolio. In some embodiments, investments (e.g., proportion values) corresponding to each spending category of the current investment portfolio are compared to investments corresponding to each spending category of the optimal investment portfolio. In some embodiments, step 510 involves determining a proportion value difference between a particular spending category of the current investment portfolio and the optimal investment portfolio.

In some embodiments, a recommended modification is determined when the proportion value difference exceeds a threshold value. For example, if an optimal investment portfolio suggests twenty percent of retirement savings should be invested in healthcare investment products, but retirement savings of the current investment portfolio only allocates five percent of retirement savings in healthcare investment products, then a proportion value difference is fifteen percent. In this example, if a predetermined threshold value is less than fifteen percent, then one or more modifications to healthcare investment products may be suggested.

At step 512, one or more recommended modifications to the current investment portfolio is determined based on a comparison of the current investment portfolio to the optimal investment portfolio. In some embodiments, a recommended modification relates to adjusting a position of one or more specific investment products as described herein. Referring to the above example, a recommended modification can relate to buying additional shares of a mutual fund relating to pharmaceutical companies, healthcare providers, assisted living facilities, and the like. In some embodiments, when an optimal spending portfolio relates to changing a proportion of investments of a particular spending category, a recommended modification can relate to changing a proportion of investments of other spending categories. Referring to the above example, increasing a proportion of healthcare investments can be indirectly facilitated by providing a recommended modification relating to decreasing investments (e.g., selling shares) of other spending categories.

Figure 6:
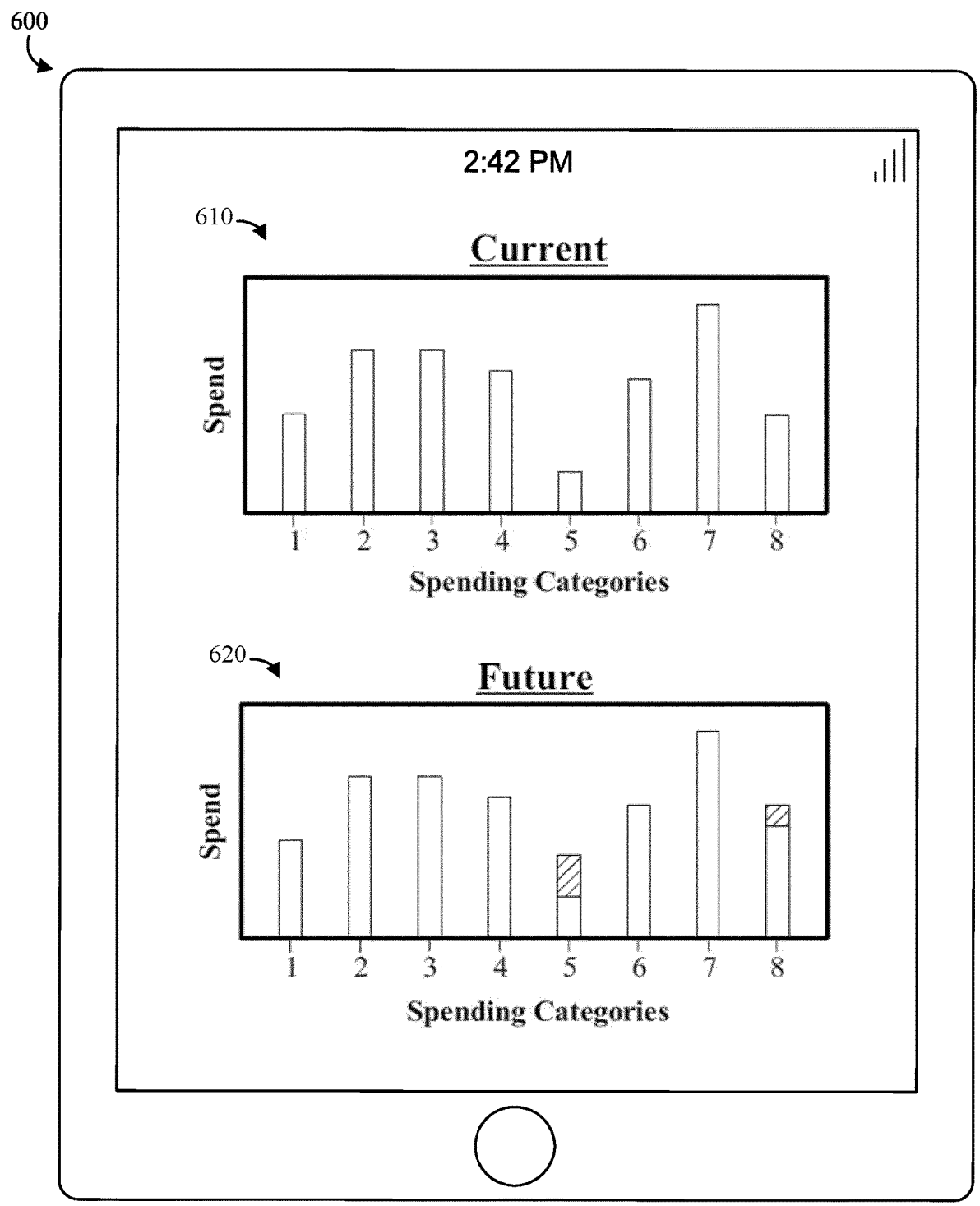
FIG. 6 shows a generated visualization used in connection with the flow diagram of FIG. 5 and the system of FIG. 1, according to an example embodiment.

Referring to FIG. 6, a generated visualization 600 used in connection with the flow diagram of FIG. 5 and the system of FIG. 1 is shown, according to an example embodiment. The visualization 600 is shown to include a chart 610 relating to current spending of a user. In particular, the chart 610 includes relative values (e.g., as a percentage, dollar amounts) of current spending according to eight spending categories. The visualization 600 is shown to also include a chart 620 relating to a predicted spending report having eight spending categories, which may be the same eight spending categories as shown in the chart 610. In some embodiments, the visualization 600 can facilitate illustrating to a user how personalized inflation may affect future spending and/or investments. In this regard, the visualization 600 can be provided to a user via the user device 104 (e.g., the display 138).

The chart 620 can be configured to include future spending with an indication of future inflation risks for one or more of the spending categories. In this regard, the chart 620 allows a user to view how future inflation may affect predicted spending. In some embodiments, the future inflation risk can be identified based on a generated personalized inflation liability model as described herein. For example, the chart 620 is shown to include an indication of a future inflation risk for the fifth spending category and the eighth spending category. In some embodiments, the visualization 600 (e.g., the chart 620) can include a combination of colors and/or patterns. For example, the fifth spending category may be provided in a dark red color and the eighth spending category may be provided in a light red color to indicate relative inflation risks.

In some embodiments, the visualization 600 is configured to include an indication of future spending relative to current spending. For example, the chart 620 can include two columns for each of the eight spending categories, with a first column representing current spending and a second column representing future spending. In some embodiments, the first and second columns can be juxtaposed next two each other. In some embodiments, the first and second columns can be partially or completely overlaid and may include various colors and/or patterns. In this regard, the visualization 600 can be configured to allow a user to view and compare current and future spending.

Figure 7:
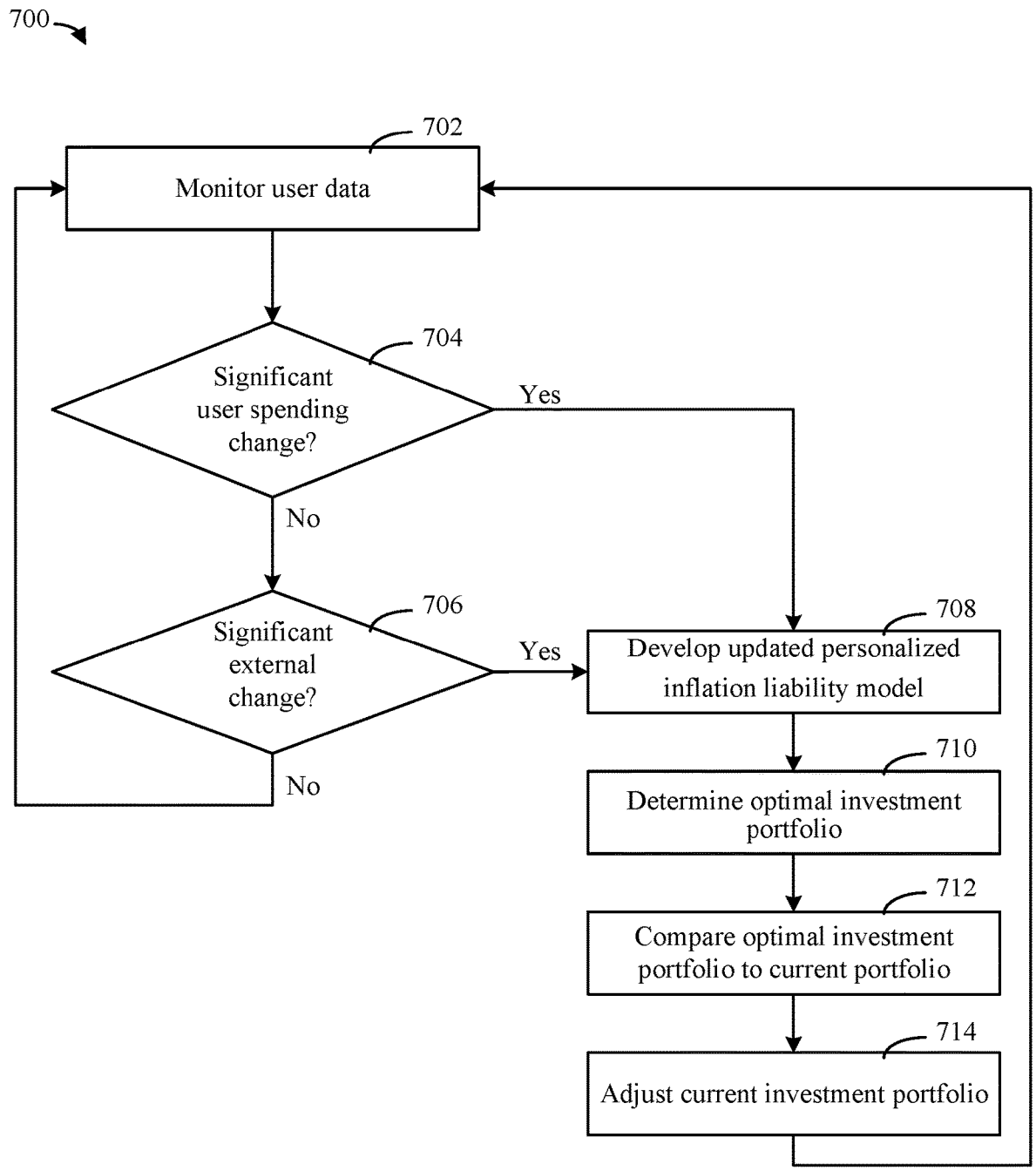
FIG. 7 is a flow diagram of a method of dynamically updating a personalized inflation liability model, according to an example embodiment.

Referring to FIG. 7, a flow diagram of a method 700 of dynamically updating a personalized inflation liability model, is shown according to an example embodiment. As described herein, the method 700 may facilitate adjusting an investment portfolio of a user in response to an automatically detected change to a personalized inflation liability model. In this regard, method 700 may be performed after method 500. In some embodiments, the method 700 is performed by the provider computing system 102.

At step 702, user data is monitored. In some embodiments, the provider computing system 102 (e.g., the data collection circuit 124) is structured to facilitate monitoring user data. For example, the provider computing system 102 can be structured to periodically receive data from one or more data sources (e.g., an activity sensor) as described herein. In some embodiments, monitored user data relates to data automatically collected from the user device 104, the data sources 106, the wearable device 202 and/or the implantable device 302. In some embodiments, the monitored data relates to information manually provided by a user. Received data can generally relate to any type of information to facilitate personalized inflation modeling and mitigation using a personalized inflation liability model as described herein.

At step 704, monitored user data is analyzed to identify a significant change in predicted user spending change. For example, data automatically received from the wearable device 202 and/or the implantable device 302 may relate to a health or medical change of a user. In this regard, it may be determined that predicted spending of the user may be significantly changed, such that the user will likely increase a relative proportion of healthcare spending. As another example, a user may have manually provided information (e.g., via the user device 104) relating to a major RV purchase. In this regard, it may be determined that predicted spending may be significantly changed such that the user will likely increase a relative proportion of transportation and/or energy spending. If a significant change in predicted spending is identified, the process continues to step 708. If a significant change in predicted spending is not identified, the process continues to step 706.

At step 706, monitored user data is analyzed to identify a significant external change. A significant external change can relate to changes in market performance (e.g., relating to holdings of a current investment portfolio), inflation rates, and/or other external factors that may indirectly affect predicted spending. For example, monitored user data may relate to an indication of a likelihood of increased inflation relating to future healthcare costs, such that the user will likely increase a relative proportion of healthcare spending. In this regard, if a significant external change is identified, the process continues to step 708. If a significant external change is not identified, the process continues to step 702, and user data continues to be monitored. Steps 708-714 can be performed as described with reference to steps 506-512.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more dedicated processors communicatively coupled to one or more dedicated memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Additionally or alternatively, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc.

An example system for implementing the overall system or portions of the embodiments might include general purpose or specific purpose computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claim.

What is claimed is:

1. A provider computing system comprising:
   a network interface structured to facilitate data communication via a network;
   a database structured to store information associated with transactions and accounts held by an institution associated with the provider computing system; and
   a processing circuit comprising a processor and a memory, the processing circuit structured to:
   receive user data, the user data comprising spending information, and a current investment portfolio of a user, the user data further comprising activity information obtained from an activity sensor that senses activity associated with the user, wherein the activity sensor is wearable by the user and connected with another activity sensor to automatically obtain health data, wherein the wearable activity sensor is structured to obtain health data by at least one of a heart rate sensor, a Global Positioning System device, an accelerometer, a gyroscope, or a temperature sensor, and wherein the wearable activity sensor includes a network interface structured to provide the health data to the provider computing system via the network;
   determine a predicted spending profile for the user based on the spending information, the predicted spending profile indicating a set of predictions of future spending, each prediction predicting future spending of the user in a single spending category of a set of spending categories, wherein at least one category of the set of spending categories relates to healthcare spending;

generate and display a user interface on a user device, the user interface including a chart showing each prediction of the set of predictions of future spending;

modify the prediction of future spending of the user for the at least one spending category relating to healthcare spending based on health information derived from the health data obtained from the wearable activity sensor;

determine an adjusted predicted spending profile for the user based on the modified prediction of future spending of the user, the adjusted predicted spending profile indicating an adjusted set of predictions of future spending, each prediction predicting future spending of the user in a single spending category of the set of spending categories;

develop a personal inflation liability model for the user based on the adjusted predicted spending profile and predicted inflation information associated with each of the spending categories, the personal inflation liability model indicating a personalized future inflation risk associated with the spending category relating to healthcare spending based on the predicted inflation information and the adjusted predicted spending profile;

modify the user interface based on the personal inflation liability model by adjusting the chart to further show each adjusted prediction of the adjusted set of predictions of future spending overlaying the prediction of future spending of the same spending category shown in the chart;

generate an optimal investment portfolio based on the current investment portfolio and the personal inflation liability model, the optimal investment portfolio configured to mitigate the personalized future inflation risk;

request user input on a recommendation to modify the current investment portfolio based on the optimal investment portfolio; and modify, in response to receiving the user input, the current investment portfolio based on the user input.

2. The provider computing system of claim 1, wherein the spending categories correspond to categories of a consumer price index.

3. The provider computing system of claim 1, wherein the processing circuit is further structured to generate a visualization on the user interface of the user device showing information relating to at least one of the predicted spending profile, the personal inflation liability model, the optimal investment portfolio, and the current investment portfolio.

4. The provider computing system of claim 1, wherein the spending information comprises a transaction history stored in the database.

5. The provider computing system of claim 1, further comprising a plurality of data sources structured to receive information relating to the user, wherein the user data comprises information received from the data sources.

6. The provider computing system of claim 5, wherein the processing circuit is further structured to:

receive user data relating to updated spending information automatically provided from at least one of the data sources;

determine an updated predicted spending profile based on the received user data automatically provided from the at least one data source;

develop an updated personal inflation liability model based on the updated predicted spending profile and updated inflation information associated with at least one of the spending categories; and modify the current investment portfolio in response to determining a new personalized future inflation risk, the new personalized future inflation risk based on the updated personal inflation liability model.

7. The provider computing system of claim 1, wherein the another activity sensor comprises an implantable device structured to receive health data of the user.

8. The provider computing system of claim 1, wherein at least one of the data sources comprises a connected device structured to receive user interest information relating to the user.

9. A system comprising:

a user device;

an activity sensor structured to sense activity associated with a user, wherein the activity sensor is wearable by the user and connected with another activity sensor to automatically obtain health data, wherein the wearable activity sensor is structured to obtain health data by at least one of a heart rate sensor, a Global Positioning System device, an accelerometer, a gyroscope, or a temperature sensor, and wherein the wearable activity sensor includes a network interface structured to provide the health data via a network;

a provider computing system comprising:

a network interface structured to facilitate data communication via the network;

a database structured to store information associated with transactions and accounts held by an institution associated with the provider computing system; and a processing circuit comprising a processor and a memory, the processing circuit structured to:

receive user data from the user device or the wearable activity sensor, the user data comprising spending information, a current investment portfolio of the user, and activity information obtained from the wearable activity sensor;

receive health data from the wearable activity sensor via the network;

determine a predicted spending profile for the user based on the spending information, the predicted spending profile indicating a set of predictions of future spending, each prediction predicting future spending of the user in a single spending category of a set of spending categories, wherein at least one category of the set of spending categories relates to healthcare spending;

generate and display a user interface on the user device, the user interface including a chart showing each prediction of the set of predictions of future spending;

modify the prediction of future spending of the user for the at least one spending category relating to healthcare spending based on health information derived from the health data obtained from the wearable activity sensor;

determine an adjusted predicted spending profile for the user based on the modified prediction of future spending of the user, the adjusted predicted spending profile indicating an adjusted set of predictions of future spending, each prediction predicting future spending of the user in a single spending category of the set of spending categories;

develop a personal inflation liability model for the user based on the adjusted predicted spending profile and predicted inflation information associated with each of the spending categories, the personal inflation liability model indicating a personalized future inflation risk associated with the spending category relating to healthcare spending based on the predicted inflation information and the adjusted predicted spending profile;

modify the user interface based on the personal inflation liability model by adjusting the chart to further show each adjusted prediction of the adjusted set of predictions of future spending overlaying the prediction of future spending of the same spending category shown in the chart;

generate an optimal investment portfolio based on the current investment portfolio and the personal inflation liability model, the optimal investment portfolio configured to mitigate the personalized future inflation risk;

request user input on a recommendation to modify the current investment portfolio based on the optimal investment portfolio; and modify, in response to receiving the user input, the current investment portfolio based on the user input.

10. The system of claim 9, wherein the spending categories correspond to categories of a consumer price index.

11. The system of claim 9, wherein the processing circuit is further structured to generate a visualization on the user interface of the user device showing information relating to at least one of: the predicted spending profile, the personal inflation liability model, the optimal investment portfolio, and the current investment portfolio.

12. The system of claim 9, wherein the spending information comprises a transaction history and the processing circuit is further structured to receive the transaction history from the database.

13. The system of claim 9, wherein the another activity sensor comprises an implantable device structured to receive health data of the user.

14. The system of claim 9, further comprising a connected device structured to receive user interest information relating to the user.

15. The system of claim 9, wherein the provider computing system further comprises a plurality of data sources structured to receive information relating to the user, wherein the user data comprises information received from the data sources, and wherein the processing circuit is further structured to:

receive user data relating to updated spending information automatically provided from at least one of the data sources;

determine an updated predicted spending profile based on the received user data automatically provided from the at least one data source;

develop an updated personal inflation liability model based on the updated predicted spending profile and updated inflation information associated with at least one of the spending categories; and modify the current investment portfolio in response to determining a new personalized future inflation risk, the new personalized future inflation risk based on the updated personal inflation liability model.

16. A method comprising:

receiving, from a user device, user data comprising spending information, a current investment portfolio of a user, and activity information obtained from an activity sensor that senses activity associated with the user, wherein the activity sensor is wearable by the user and connected with another activity sensor to automatically obtain health data, wherein the wearable activity sensor is structured to obtain health data by at least one of a heart rate sensor, a Global Positioning System device, an accelerometer, a gyroscope, or a temperature sensor, and wherein the wearable activity sensor includes a network interface structured to provide the health data via the network;

receiving, from the wearable activity sensor via the network, the health data;

determining, by a processing circuit of a provider computing system, a predicted spending profile for the user based on the spending information, the predicted spending profile indicating a set of predictions of future spending, each prediction predicting future spending of the user in a single spending category of a set of spending categories, wherein at least one category of the set of spending categories relates to healthcare spending;

generating and displaying a user interface on the user device, the user interface including a chart showing each prediction of the set of predictions of future spending;

modifying the prediction of future spending of the user for the at least one spending category relating to healthcare spending based on health information derived from the health data obtained from the wearable activity sensor;

determining an adjusted predicted spending profile for the user based on the modified prediction of future spending of the user, the adjusted predicted spending profile indicating an adjusted set of predictions of future spending, each prediction predicting future spending of the user in a single spending category of the set of spending categories;

developing, by the processing circuit, a personal inflation liability model for the user based on the adjusted predicted spending profile and predicted inflation information associated with each of the spending categories, the personal inflation liability model indicating a personalized future inflation risk associated with the spending category relating to healthcare spending based on the predicted inflation information and the adjusted predicted spending profile;

modifying the user interface based on the personal inflation liability model by adjusting the chart to further show each adjusted prediction of the adjusted set of predictions of future spending overlaying the prediction of future spending of the same spending category shown in the chart;

generating, by the processing circuit, an optimal investment portfolio based on the current investment portfolio and the personal inflation liability model, the optimal investment portfolio configured to mitigate the personalized future inflation risk;

requesting, from the user device, user input on a recommendation to modify the current investment portfolio based on the optimal investment portfolio; and modifying, by the processing circuit and in response to receiving the user input, the current investment portfolio based on the user input.

17. The method of claim 16, wherein the spending categories correspond to categories of a consumer price index.

18. The method of claim 16, further comprising:
generating a visualization on the user interface of the user device showing information relating to at least one of: the predicted spending profile, the personal inflation liability model, the optimal investment portfolio, and the current investment portfolio.

19. The method of claim 16, wherein the received user data further comprises information received from a plurality of data sources.

20. The method of claim 19, wherein at least one of the data sources comprises an implantable device structured to receive health data of the user.

21. The method of claim 19, wherein at least one of the data sources comprises a connected device structured to receive user interest information relating to the user.

22. The method of claim 16, wherein the spending information comprises a transaction history of the user and the method further comprises receiving, from a database, the transaction history.

23. The method of claim 16, further comprising:
receiving, by the processing circuit, user data relating to updated spending information automatically provided from at least one of the data sources;

determining, by the processing circuit, an updated predicted spending profile based on the received user data automatically provided from the at least one data source;

developing, by the processing circuit, an updated personal inflation liability model based on the updated predicted spending profile and updated inflation information associated with at least one of the spending categories; and modifying, by the processing circuit, the current investment portfolio in response to determining a new personalized future inflation risk, the new personalized future inflation risk based on the updated personal inflation liability model.

* * * * *